(12) United States Patent
Muraoka et al.

(10) Patent No.: US 7,663,988 B2
(45) Date of Patent: Feb. 16, 2010

(54) OPTICAL DISC APPARATUS AND METHOD OF SETTING DEFOCUS VALUE THEREOF

(75) Inventors: Yasuhiro Muraoka, Gunma (JP); Tatsushi Arai, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 545 days.

(21) Appl. No.: 11/560,248

(22) Filed: Nov. 15, 2006

(65) Prior Publication Data

US 2008/0037123 A1    Feb. 14, 2008

(30) Foreign Application Priority Data

Jun. 6, 2006    (JP)    ............... 2006-157220

(51) Int. Cl.
*G11B 7/00*    (2006.01)
(52) U.S. Cl. ................. 369/44.32; 369/44.25
(58) Field of Classification Search .............. 369/44.34, 369/44.35, 44.32, 44.25, 44.26, 4.26
See application file for complete search history.

(56) References Cited

U.S. PATENT DOCUMENTS 7,283,438 B2 * 10/2007 Ukawa ............... 369/44.35

FOREIGN PATENT DOCUMENTS

| JP | 7-262584 | 10/1995 |
| JP | 10-228652 | 8/1998 |
| JP | 2002-342948 | 11/2002 |

* cited by examiner

Primary Examiner—Nabil Z Hindi
(74) Attorney, Agent, or Firm—Fish & Richardson P.C.

(57) ABSTRACT

An optical disc apparatus is disclosed that comprises a jitter value detecting circuit that detects a jitter value based on the signal read out from an optical disc; and a defocus value setting circuit that adjusts a defocus value used for moving an objective lens along the direction of a light axis when focusing of the objective lens to the optical disc is performed, based on the signal that has gone through the jitter value detecting circuit, and causes a defocus adjustment to be made based on the defocus value.

10 Claims, 4 Drawing Sheets

OPTICAL DISC APPARATUS AND METHOD OF SETTING DEFOCUS VALUE THEREOF

CROSS-REFERENCE TO RELATED APPLICATION

This application claims the benefit of priority to Japanese Patent Application No. 2006-157220, filed Jun. 6, 2006, of which full contents are incorporated herein by reference.

BACKGROUND OF THE INVENTION

1. Field of the Invention

The present invention relates to an optical disc apparatus and a defocus value setting method thereof, capable of recording a signal on an optical disc by laser light irradiated by an optical pickup unit and reproducing the signal recorded on the optical disc by the laser light.

2. Description of the Related Art

Laser light irradiated by an optical pickup unit (OPU) of an optical disc apparatus is focused on a signal face of an optical disc. Laser is an abbreviation of "light amplification by stimulated emission of radiation". Various kinds of technology of focusing the laser light on the signal face of the optical disc or so-called focus control technology are available. Generally, focus control is performed using a signal obtained from a photodetector incorporated in the optical pickup unit.

The focus means a focal point or a focal point of lens. Focusing means brining into focus or being brought into focus. A defocus adjustment as used in the present specification means, for example, an adjustment work of bringing into focus something that is out of focus.

Description will be made of the focus control found in publications. A focus control device, and a focus pull-in method, is known that performs a focus pull-in operation in a short time and securely in an optical disc whose reflection ratio varies depending on the state or a phase-change optical disc whose reflection ratio varies depending on heat of irradiated light (see, e.g., Japanese Patent Application Laid-Open Publication No. 2002-342948 (pp. 1 and 3 to 5, FIG. 1-5)).

The focus control is performed by a circuit called a focus servo circuit and displacement movement of an objective lens is performed, for example, with the position of movement center of the objective lens used as a reference. Servo means a mechanism, etc., of measuring a state of an object to be controlled, comparing thus measured value with a predetermined reference value, and automatically controlling for correction.

For example, there is the optical pickup unit equipped with a system that is capable of applying an arbitrary offset by a focus mechanism and adjusts a jitter at the time of reading out data from a disc by a focus offset or so-called defocus. The jitter means a subtle vibration or distortion of the signal.

For example, the optical pickup unit is known in which the position of the movement center of the objective lens is adjusted by detecting a value of the jitter contained in the signal such as a reproduced signal (see, e.g., Japanese Patent Application Laid-Open Publication No. 1995-262584 (pp. 1 and 2, FIG. 1-6)).

Usually, in the optical pickup unit, an F bias value of the focus or so-called defocus value is varied and the defocus value is set at an optimum jitter value.

For example, an optical disc reading unit is known that, by detecting the correlation between the focus bias volume of displacing a reference position of the focus of the pickup and the jitter value of the data read out by the pickup, can obtain the focus bias volume corresponding to the optical disc (see, e.g., Japanese Patent Application Laid-Open Publication No. 1998-228652 (pp. 1 and 2, FIG. 1-8)).

The focus control in the optical disc apparatus is performed utilizing a focus error signal obtained by the photodetector. When the objective lens is displaced by the focus control substantially along the direction orthogonal to the face of the optical disc, the focus error signal called an S-shaped curve is obtained, for example, as described in the above Japanese Patent Application Laid-Open Publication No. 2002-342948. Then, when the level of the focus error signal comes within a focusing controllable range with its center at a point called zero cross of the S-shaped curve, the focus servo operation is performed and the focus control is executed. With the focus servo operation being performed, the operation of focusing the laser light irradiated by a laser diode on the signal face of the optical disc is performed.

Conventional optical pickup units had the problem that due to the difference between individual pickup units themselves and the difference between individual optical discs, a focused focal point controlled by the focus point and the focus servo operation was not performed in optimum condition.

To solve the above problem, for example, the optical disc reading unit was proposed that is shown in the above Japanese Patent Application Laid-Open Publication No. 1998-228652. However, in this optical disc reading unit, it is feared, for example, that since the focus bias volume is set by arithmetic processing, a long time is required for setting processing.

When a method of setting the focus bias volume based on the minimum value of the jitter value is employed, the following problem is feared. For example, some of the optical discs used have very slight change of the jitter value. The bias volume set in the case of such optical discs sometimes became the focus bias volume at the edge of the detecting range. When the focus bias volume was set as above, there was a problem that the focus servo operation became unstabilized.

Detailed description will now be given. With respect to some optical discs, when the defocus value was adjusted by the optical pickup unit, the jitter value corresponding to the defocus value hardly changed and with respect to other optical discs, the jitter value became reading-stable jitter value even if the defocus value was set at 0. When the defocus value is set to meet the optimum jitter with respect to such optical discs, such defocus value makes the servo unstable and causes a loss of focus or so-called F loss, etc. to take place.

The loss of focus means, for example, that a focal point of the laser light irradiated from the optical pickup unit is caused to deviate relative to pits of the disc being tracked and thereby the data stored on the disc becomes unreadable. A pit means a hole or depression.

For example, when the defocus adjustment is made based on the detected jitter, the F loss sometimes happened in the optical pickup units that had small jitter change. It was possible that at the time of the defocus adjustment, the optical pickup unit that had small jitter change was set at the defocus value away from the center value corresponding to the movement center of the objective lens. In the optical pickup unit with such setting made, the F loss sometimes happened.

SUMMARY OF THE INVENTION

The present invention was conceived to solve the above problems. In view of the above, the object of the present invention is to provide an optical disc apparatus capable of setting an optimum defocus value and a defocus value setting method thereof.

In order to achieve the above objects, according to a first aspect of the present invention there is provided an optical disc apparatus comprising a jitter value detecting circuit that detects a jitter value that is a fluctuation value of a signal, based on the signal read out from an optical disc; and a defocus value setting circuit that adjusts a defocus value used for moving an objective lens along the direction of a light axis when focusing of the objective lens to the optical disc is performed, based on the signal that has gone through the jitter value detecting circuit, and causes a defocus adjustment to be made based on the defocus value.

By the above configuration, the optical disc apparatus capable of setting an optimum defocus value is configured. The jitter means a subtle vibration or distortion of the signal. The focus means a focal point or a focal point of lens. The defocus adjustment means, for example, an adjustment work of bringing into focus something that is out of focus. By the jitter value detected based on the signal read out from the optical disc and the defocus value based on the detected jitter value, the optimum defocus value is set at the optical disc apparatus.

In order to achieve the above objects, according to a second aspect of the present invention there is provided a defocus value setting method of an optical disc apparatus, comprising detecting of a jitter value of a signal read out from an optical disc, using the optical disc apparatus comprising an optical pickup unit having an objective lens; adjusting of a defocus value used for moving the objective lens along the direction of a light axis when focusing of the objective lens to the optical disc is performed, based on the jitter value and adjusting of a focus of the objective lens to the optical disc; detecting of the jitter value each time the defocus value is changed step by step within a predetermined range of numerical value including a reference value of the defocus value; and setting of an optimum defocus value based on a value of difference between a maximum jitter value and a minimum jitter value out of the detected jitter values.

By the above configuration, the optimum defocus value is set at the optical disc apparatus. Since the jitter value is detected each time the defocus value is changed step by step within the predetermined range of numerical value including the reference value of the defocus value and the optimum defocus value is set based on the value of the difference between the maximum jitter value and the minimum jitter value in the detected jitter value, the optimum defocus value is set at the optical disc apparatus.

In order to achieve the above objects, according to a third aspect of the present invention there is provided a defocus value setting method of an optical disc apparatus, comprising detecting of a jitter value each time a defocus value is changed step by step within a predetermined range of numerical value including a reference value of the defocus value; and setting of an optimum defocus value based on a value of difference between a maximum jitter value and a minimum jitter value out of the detected jitter values, when a focus adjustment of an objective lens to an optical disc is made and the jitter value it detected by reading out a signal from the optical disc, using the optical disc apparatus including a focus servo circuit to which a focus error signal is input that is generated based on the signal detected by a photodetector installed in an optical pickup unit and which generates a control signal to displace the objective lens installed in the optical pickup unit substantially along the direction of a light axis that is the direction orthogonal to a face of the optical disc; a jitter value detecting circuit that detects the jitter value that is a fluctuation value of the signal, based on the signal detected by the photodetector; and a defocus value setting circuit that adjusts the defocus value used for moving the objective lens along the direction of the light axis when focusing of the objective lens to the optical disc is performed, based on the signal that has gone through the jitter value detecting circuit, and causes the focus servo circuit to make a defocus adjustment based on the defocus value.

By the above configuration, the optimum defocus value is set in the optical disc apparatus. Servo means a mechanism, etc., of measuring a state of an object to be controlled, comparing thus measured value with a predetermined reference value, and automatically controlling for correction. Since the jitter value is detected each time the defocus value is changed step by step within the predetermined range of numerical value including the reference value of the defocus value and the optimum defocus value is set based on the value of the difference between the maximum jitter value and the minimum jitter value in the detected jitter value, the optimum defocus value is set in the optical disc apparatus. Since the optimum defocus value is set in the optical disc apparatus, the optical pickup unit performs a stabilized focus servo operation relative to the optical disc apparatus, the optical pickup unit performs a stabilized focus servo operation relative to the optical disc.

The defocus value setting method of an optical disc apparatus of the present invention may further comprise setting of the defocus value corresponding to the minimum jitter value as the optimum defocus value when the value of difference between the maximum jitter value and the minimum jitter value is greater than a predetermined value.

By the above configuration, the optical pickup unit making up the optical disc apparatus performs the stabilized focus servo operation relative to the optical disc. The optical disc with which the value of the difference between the maximum jitter value and the minimum jitter value is greater than the predetermined value is considered to be the optical disc of poor jitter characteristics. Since the defocus value corresponding to the minimum jitter value is set as the optimum defocus value when the signal is read out form the optical disc of the poor jitter characteristics, the stabilized focus servo operation is executed at the optical pickup unit.

The defocus value setting method of an optical disc apparatus of the present invention may further comprise setting of the reference value of the defocus value as the optimum defocus value when the value of difference between the maximum jitter value and the minimum jitter value is smaller than a predetermined value.

By the above configuration, the optical pickup unit making up the optical disc apparatus performs the stabilized focus servo operation relative to the optical disc. The optical disc with which the value of the difference between the maximum jitter value and the minimum jitter value is smaller than the predetermined value is considered to be the optical disc of good jitter characteristics. Since the reference value of the defocus value is set in the optical disc apparatus as the optimum defocus value when the signal is read out from the optical disc of the good jitter characteristics, no problem is caused to the focus servo operation of the optical pickup unit and the stabilized focus servo operation is executed at the optical pickup unit.

The defocus value setting method of an optical disc apparatus of the present invention may further comprise detecting of the jitter value based on the reference value of the defocus value; and setting of the reference value of the defocus value as the optimum defocus value when the detected jitter value is smaller than a predetermined jitter value, before performing an operation of detecting the jitter value, each time the defocus value is changed step by step within the predetermined range of numerical value including the reference value of the defocus value.

By the above configuration, when the optical disc of good jitter characteristics is used, the defocus value is speedily set, and the optical pickup unit making up the optical disc apparatus performs the stabilized focus servo operation relative to the optical disc. The optical disc with which the value of the difference between the maximum jitter value and the minimum jitter value is smaller than the predetermined value is considered to be the optical disc of good jitter characteristics. Since the reference value of the defocus value is set in the optical disc apparatus as the optimum defocus value when the signal is read out from the optical disc of the good jitter characteristics, no problem is caused to the focus servo operation of the optical pickup unit and the stabilized focus servo operation is executed at the optical pickup unit.

The optical disc apparatus of the present invention may execute the defocus value setting method of an optical disc apparatus of the present invention.

The above configuration enables provision of the optical disc apparatus capable of setting the optimum defocus value.

Features of the present invention will become apparent from accompanying drawings and the description of this specification.

BRIEF DESCRIPTION OF THE DRAWINGS

For more thorough understanding of the present invention and advantages thereof, reference should be made to the following description together with accompanying drawings, in which.

DETAILED DESCRIPTION OF THE INVENTION

Detailed description will then be made of an embodiment of an optical disc apparatus and a defocus value setting method thereof according to the present invention.

Figure 1:
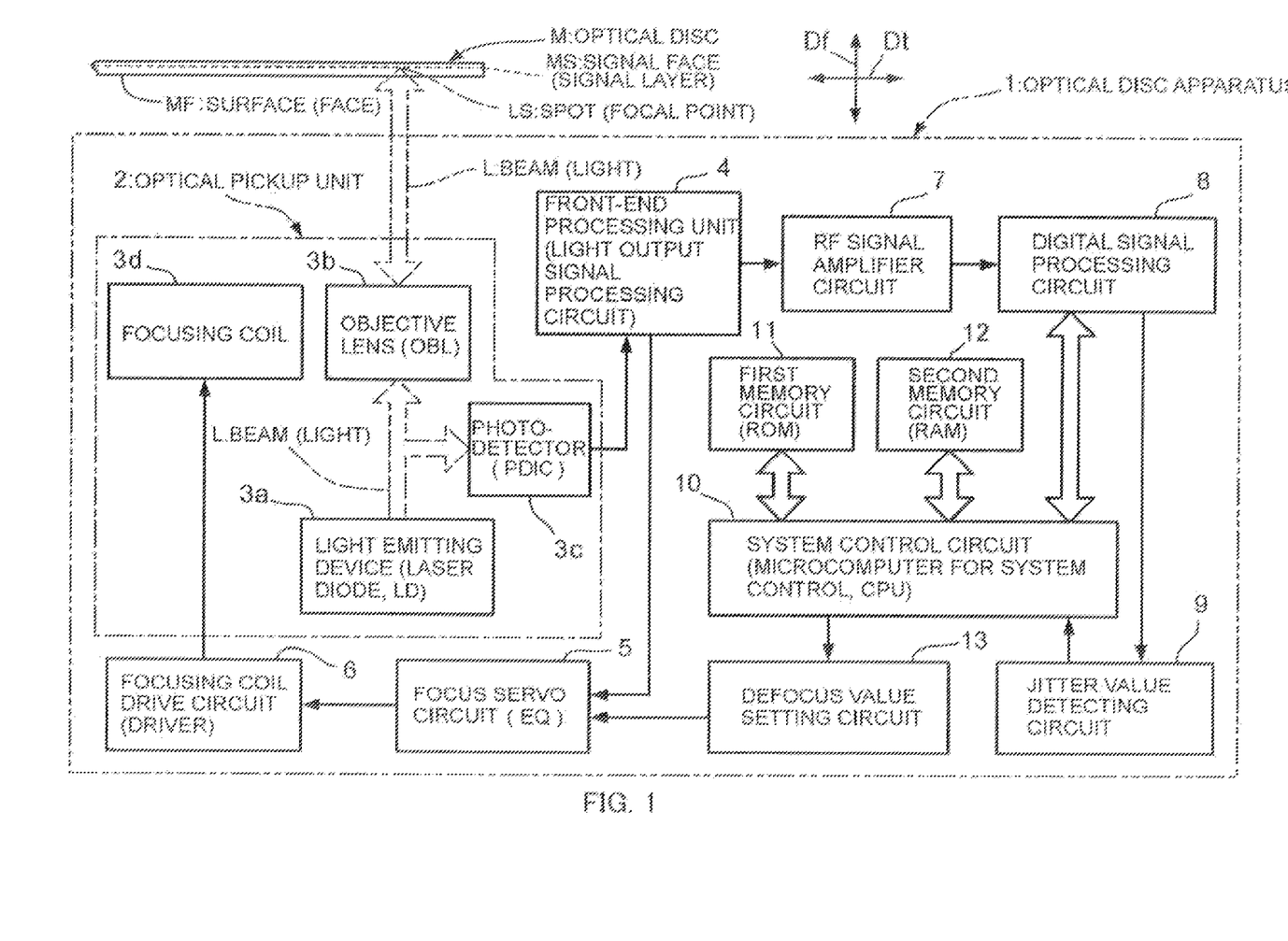
FIG. 1 is a block diagram of an embodiment of an optical disc apparatus according to the present invention.
Figure 2:
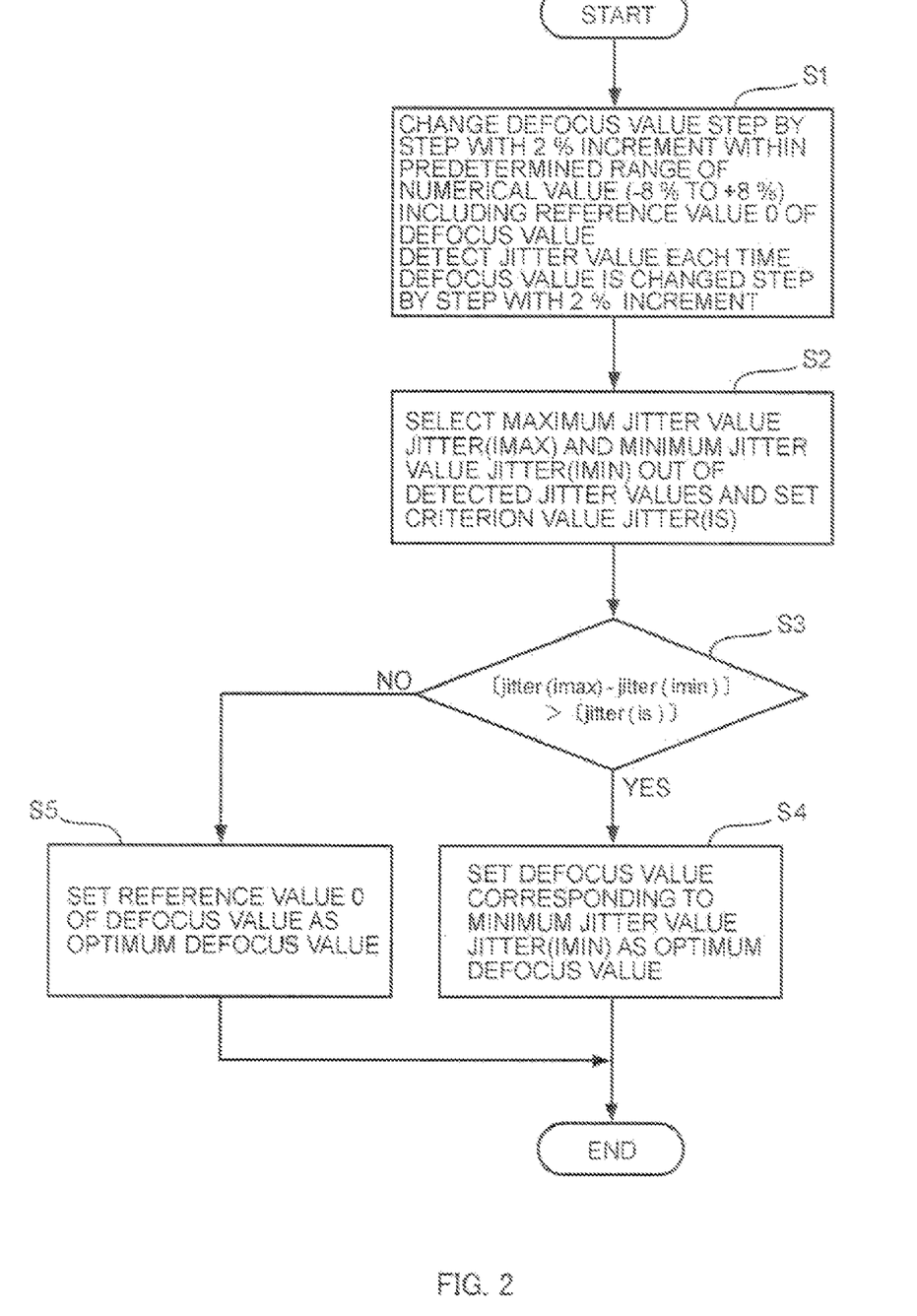
FIG. 2 is a flow chart of an embodiment of a defocus value setting method of the optical disc apparatus according to the present invention.
Figure 3:
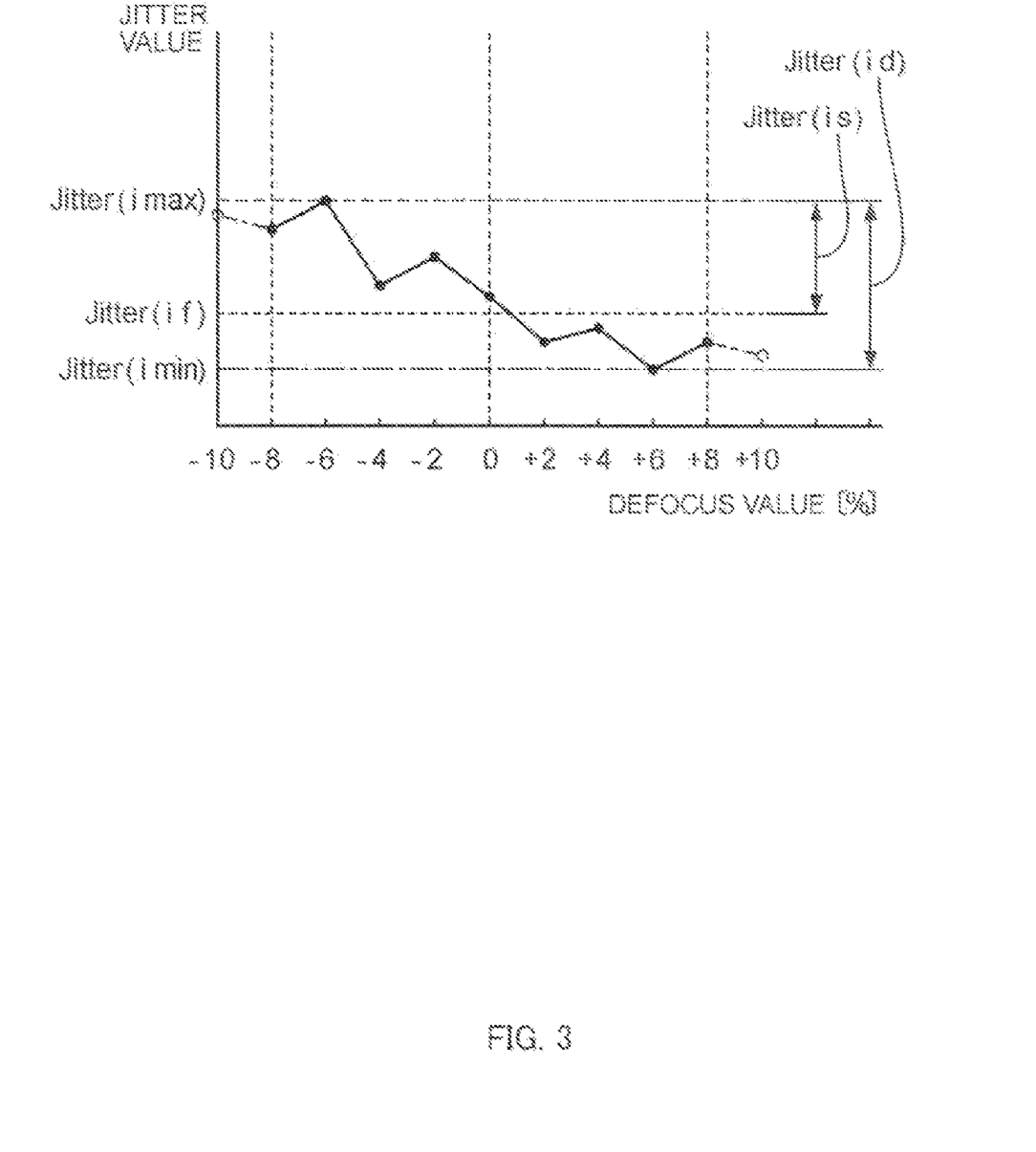
FIG. 3 is a graph of relationship between a defocus value and a jitter value.
Figure 4:
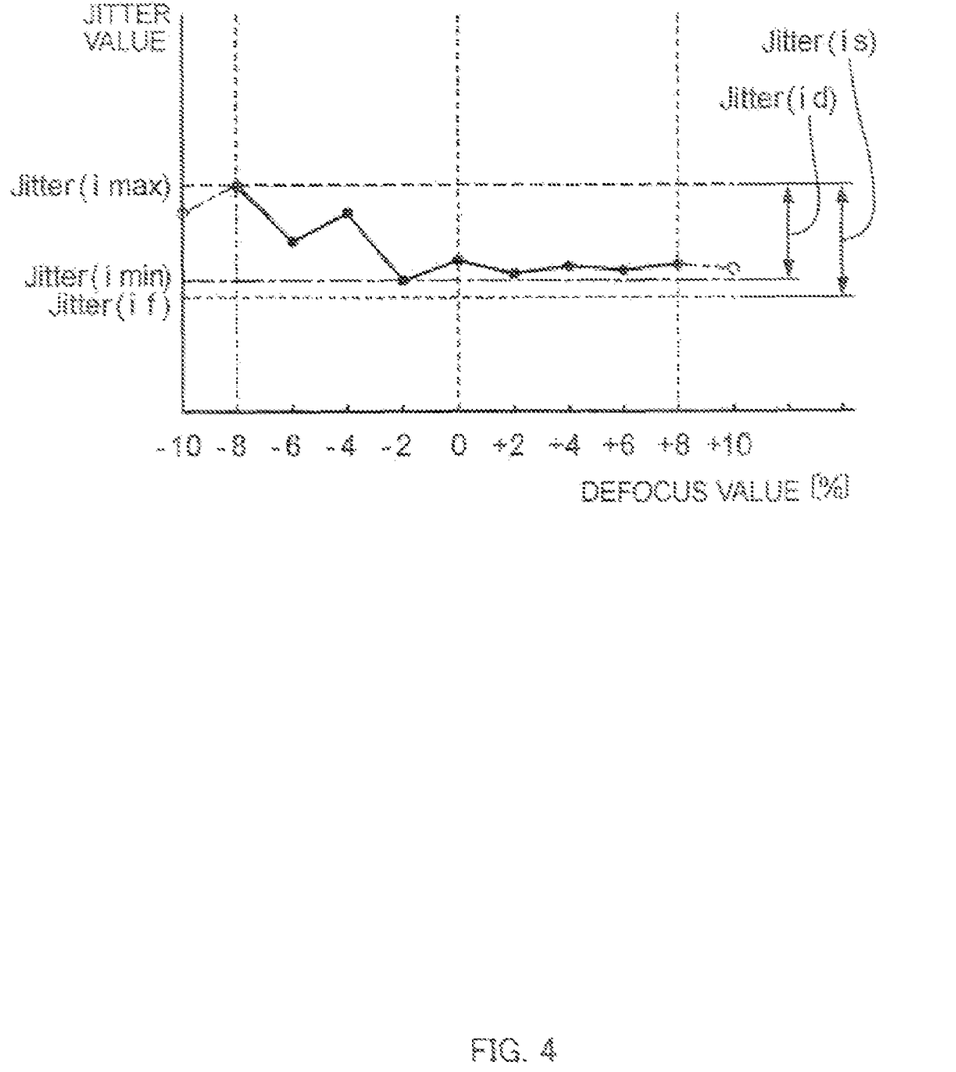
FIG. 4 is also a graph of the relationship between the defocus value and the jitter value.

FIG. 1 is a block diagram of an embodiment of the optical disc apparatus according to the present invention, FIG. 2 is a flow chart of an embodiment of the defocus value setting method of the optical disc apparatus according to the present invention, FIG. 3 is a graph of relationship between a defocus value and a jitter value, and FIG. 4 is also a graph of the relationship between the defocus value and the jitter value.

The optical disc apparatus 1 shown in FIG. 1 is configured to be capable of setting the defocus value suitable for performing a focus servo movement, using the jitter value of a signal obtained from an optical disc N. As described above, the jitter means a subtle vibration or distortion of the signal. The focus means a focal point or a focal point of lens. The servo means a mechanism, etc., of measuring a state of an object to be controlled, comparing thus measured value with a predetermined reference value, and automatically controlling for correction. The defocus adjustment as used in this specification means, for example, an adjustment work of bringing into focus something that is out of focus.

Reproduction or recording of data such as information on the optical disc M is performed using an optical pickup unit 2 incorporated inside the optical disc apparatus 1. Among the optical discs M are, for example, CD-series optical discs, DVD-series optical discs, etc. "CD" is an abbreviation of "Compact Disc" (trademark). "DVD" is an abbreviation of "Digital Versatile Disc" (registered trademark).

The optical disc M is placed on a turntable (not shown) driven to rotate by a spindle motor (not shown). The optical pickup unit 2 is equipped with a light emitting device 3a, or so-called laser diode, that irradiates a light beam L called laser light L to the optical disc M. The optical pickup unit 2 is also equipped with an objective lens 3b that focuses the light beam L emitted by the laser diode 3a and irradiates it onto the signal face Ms of the optical disc M. With the laser light L being focused by the objective lens 3b, a condensed spot Ls is irradiated and formed on the signal face Ms of the optical disc M.

The optical pickup unit 2 is also equipped with a photodetector 3c that receives the light beam L reflected at the signal face Ms of the optical disc M. The photodetector 3c is intended for receiving the laser light L reflected at the signal fade Ms of the optical disc M, converting the signal to an electrical signal, and detecting the information recorded on the signal face Ms of the optical disc M. The photodetector 3c is also intended for receiving the laser light reflected at the signal face Ms of the optical disc M, converting the signal to the electrical signal, and operating a servo mechanism (not shown) of a lens holder (not shown) with the objective lens 3b which is making up the optical pickup unit 2.

The optical pickup unit 2 comprises a focusing coil 3d that displaces the objective lens 3b substantially along the direction Df orthogonal to a face Mf of the optical disc M and tracking coil (not shown) that displaces the objective lens 3b substantially along the direction of the diameter Dt of the optical disc M. Definition of the direction Df or Dt such as the focusing direction Df or the tracking direction Dt in this specification is the definition for convenience sake for describing the optical disc apparatus 1 and the optical pickup unit 2.

As described above, the focusing means bringing into focus or being brought into focus. The tracking means the motion of tracking and observing be use of light the minute pits, grooves, wobble, etc., provided on the signal face Ms of the optical disc M and determining the position of the track formed substantially in spiral. The pit means a hole or depression. The groove means a long, narrow furrow or depression. The wobble means a movement from side to side of the track on which the signal of data such as information is recorded.

An optical pickup is generally abbreviated as "CPU". An "optical pickup unit" is sometimes abbreviated as "OPU". Here, for convenience sake, the optical pickup unit is abbreviated as "OPU". The laser diode is abbreviated as "LD". The objective lens is abbreviated as "OBL". The photodetector/ photodiode IC is abbreviated as "PD" or "PDIC".

The OPU 2 comprises the LD 3a, the OBL 3b, the PDIC 3c, the focusing coil 3d, and the tracking coil. The OPU 2 is moved by a feed motor (not shown) which is able to drive pickup unit body, substantially along the diameter direction Dt of the optical disc M. The CPU 2 making up the optical disc apparatus 1 further comprises the feed motor, depending on the design or specification of the OPU 2.

This optical disc apparatus 1 is equipped with a light output signal processing circuit 4 to which the signal detected at the PDIC 3c installed in the OPU 2 is input and which outputs the signal detected at the PFIC 3c as an RF signal that is a high frequency signal. The RF signal means, for example, a signal converted to a high frequency substantially the same as that of an electromagnetic wave. The "RF" is an abbreviation of "radio frequency".

The signal converted from a light signal to an electric signal by the PDIC 3c installed in the OPU 2 is input to the light output signal processing circuit 4 or a so-called front-end processing unit 4. The front-end processing unit 4 is configured to generate and output the RF signal that is a reproduced signal of the signal recorded on the optical disc M, a focus error signal, and a tracking error signal.

The focus error means a displacement of a focal point Ls of the light L focused by the OBL 3b, along the direction Df substantially orthogonal to a signal layer Ms such as a light axis direction Df, relative to the pits or grooves (neither shown) of the optical disc M. The tracking error means a displacement of a focal point Ls of the light L focused by the OBL 3b, in the direction Dt substantially along the signal layer Ms such as the diameter direction Dt, relative to the pits or grooves (neither shown) of the optical disc M.

The optical disc apparatus 1 is also equipped with a focus servo circuit 5 to which the focus error signal in input that is generated by the front-end processing unit 4 based on the signal detected by the PDIC 3c and which generates a control signal to displace the OBL 3b installed in the OPU 2 substantially along the direction Df of the light axis of the OBL 3b that is the direction orthogonal to the face Mf of the optical disc M. The focus error signal generated at the front-end processing unit 4 and then output from the front-end processing unit 4 is input to the focus servo circuit 5.

The focus servo circuit 5 is configured as a digital equalizer capable of dealing with a digital signal. The digital means expressing the state of matter or system by signals of discrete numerals, characters, etc. The equalizer is an electric circuit for processing or adjusting overall frequency characteristics of the signal such as audio signal. The equalizer is abbreviated as "EQ".

This optical disc apparatus is also equipped with a focusing coil drive circuit 6 to which the focus control signal is input that is output form the focus servo circuit 5 and which supplies a driving signal to the focusing coil 3d installed in the OPU 2. The focus servo circuit 5, based on the input focus error signal, outputs the focus control signal for reducing the level of the focus error signal to the focusing coil drive circuit 6. The focus control signal output form the focus servo circuit 5 is input to the focusing coil drive circuit 6. The focusing coil drive circuit 6 is configured to supply a focusing coil driving signal to the focusing coil 3d. The drive circuit is called a driver, etc.

This optical disc apparatus 1 is also equipped with an RF signal amplifier circuit 7 that amplifies the signal detected at the PDIC 3c and converted to the RF signal at the front-end processing unit 4, and converts the RF signal, an analog signal, to a digital signal. The analog means expressing the state of matter of system by a continuously changing physical quantity, etc.

The RF signal that is a reproduced signal generated at the front-end processing circuit 4 is input to the RF signal amplifier circuit 7. At the RF signal amplifier circuit 7 the RF signal is amplified. The RF signal amplifier circuit 7 is configured to output the input analog signal as a binalized signal or so-called digital signal. Based on the signal output from the RF signal amplifier circuit 7, the jitter value is satisfactorily detected.

The optical disc apparatus 1 is also equipped with a digital signal processing circuit 8 that demodulates the digital signal output from the RF signal amplifier circuit 7. The digital signal output from the RF signal amplifier circuit 7 is input to the digital signal processing circuit 8. The digital signal processing circuit 8 is configured to perform demodulating operation of various signals.

This optical disc apparatus 1 is also equipped with a jitter value detecting circuit 9 that detects the jitter value that is a fluctuation value of the signal, based on the signal read out from the optical disc M by the OPU 2 having the OBL 3b. To be more specific, this optical disc apparatus 1 is equipped with the jitter value detecting circuit 9 or so-called jitter measuring circuit 9 that detects the jitter value that is the fluctuation value of the signal, based on the signal that runs through the RF signal amplifier circuit 7 and is output from the digital signal processing circuit 8.

The signal generated at the digital signal processing circuit 8 is input to the jitter value detecting circuit 9. For example, when the optical disc M is a CD-standard optical disc, at the jitter value detecting circuit 9, the signal with the length of 3T to 11T is detected, and timing variation of the frequency of the reproduced signal, namely, the jitter value, is detected based on the reference clock signal. The smaller the jitter value detected at the jitter value detecting circuit 9 is, the smaller the timing variation is, and the smaller the timing variation is, the better the reproducing characteristics are.

When a synchronization signal is detected out of the RF signal, the timing variation of the frequency F is detected based on the reference clock. The smaller value this timing variations has, the smaller the timing variation is, and the smaller the timing variation is, the better the performance is. The reference clock is abbreviated, for example, as reference CLK. The signal length of the synchronization signal is, for example, 3T to 11T for CD series and 3T to 14T for DVD series.

This optical disc apparatus 1 is also equipped with a system control circuit 10 to which the signal output from the jitter value detecting circuit 9 is input and which performs control of the optical disc apparatus 1 as a whole. Various kinds of control and operation of the optical disc apparatus 1 and the OPU 2 are performed by the system control circuit 10. The system control circuit 10 comprises a microcomputer. The microcomputer means an ultraminiature computer.

The microcomputer for the system control, referred to as a CPU, system controller, microprocessor, or microcomputer, is a control unit in charge of the systems control of the optical disc apparatus 1 as a whole. The "CPU" is an abbreviation of "Central Processing Unit" and means a central arithmetic units. Each function of the CPU 10 is realized by software of so-called programs.

This optical disc apparatus 1 is also equipped with a first memory circuit 11 in which the programs causing the CPU 10 to perform various kinds of control is stored. Functions to be realized by the software are stored in the first memory circuit 11 accessible by the CPU 10. The system control circuit 10 is configured to perform various kinds of control and operation based on the programs stored in the first memory circuit 11 such as a flash ROM. "ROM" is an abbreviation of "read-only memory". For example, a flash memory is used as the first memory circuit 11.

Detailed description will now be made of the first memory circuit 11. For example, a ROM such as an EEPROM may be cited as the first memory circuit 11. The ROM means a memory dedicated to reading. The EEPROM means a ROM in which contents can electrically be rewritten. The EEPROM is so-called non-volatile memory. Change of contents of the EEPROM is made by a voltage higher than a normal voltage. Information stored in the EEPROM is electrically erasable. The "EEPROM" is an abbreviation of "Electrically Erasable and Programmable Read Only Memory".

For example, a ROM such as an EEPROM may be cited as the first memory circuit 11. The EPROM is a ROM in which memory erasing and writing can be made any number of times. Erasing of memory in the EPROM is made by a special method different from the method used at the time of reading out. "EPROM" is an abbreviation of "Erasable and Programmable Read Only Memory".

This optical disc apparatus 1 is also equipped with a second memory circuit 12 that can memorize and erase various values input to the CPU 10. For example, a RAM is used as the second memory circuit 12. The RAM means a memory device in which any data can be accessed within substantially the same time irrespective of a memory location or order of memorization. "RAM" is an abbreviation of "random access memory". The system control circuit 10 controls the operation of the second memory circuit 12 such as the RAM. The second memory circuit 12 is configured to be capable of memorizing the defocus value and the jitter value corresponding to the defocus value.

This optical disc apparatus 1 is also equipped with a defocus value setting circuit 13 that adjusts the defocus value used for moving the OBL 3b along the direction Df of the light axis of the OBL 3b when the focusing of the OBL 3b is made relative to the signal face Ms of the optical disc M, based on the signal that has gone through the jitter value detecting circuit 9 and the CPU 10, and causes the defocus serve circuit 5 to make a defocus adjustment based on the adjusted defocus value.

The defocus value to the focus servo circuit 5 is set by the defocus value setting circuit 13. The defocus value setting circuit 13 is configured to be controlled by the system control circuit 10. When, after the loading of an optical disc M into the optical disc apparatus 1, the operation for setting the defocus value suitable for the optical disc M is performed in the optical disc apparatus 1, the defocus value set to the focus servo circuit 5 is changed from −8% to −9% step by step with an increment of 2%, for example, relative to the defocus value 0 as the reference value.

The optical disc apparatus 1 shown in FIG. 1 comprises the OPU 2 having the PDIC 3c, the focusing coil 3d, etc., the front-end processing unit 4, the focus servo circuit 5, the focusing coil drive circuit 6, the RF signal amplifier circuit 7, the digital signal processing circuit 8, the jitter value detecting circuit 9, the system control circuit 10, the first memory circuit 11, the second memory circuit 12, and the defocus value setting circuit 13.

By the configuration of the optical disc apparatus 1 as shown in FIG. 1, the optical disc apparatus 1 capable of setting the optimum defocus value is configured. By the jitter value detected based on the signal read out from the optical disc M and by the defocus value based on the detected jitter value, the optimum defocus value is set in the optical disc apparatus 1.

Description will then be made of the defocus value setting method of the optical disc apparatus 1. Description will be made of the defocus value setting method of the optical disc apparatus 1, based on a flow chart shown in FIG. 2 together with drawings.

The defocus adjustment of the optical disc apparatus 1 based on the jitter value is performed as follows. At the time of reproduction or recording of the optical disc M (FIG. 1), the servo adjustment such as data reading has been finished. In this case, it may be after a focus offset adjustment has already been performed or it may be before the focus offset adjustment is performed.

Using the optical disc apparatus 1, the focus adjustment of the OBL 3b relative to the signal face Ms of the optical disc M is made. Using the optical disc apparatus 1, the defocus value setting in the optical disc apparatus 1 is performed.

The defocus value setting method of this optical disc apparatus 1 is the method of performing the focus adjustment of the OBL 3b relative to the optical disc M by detecting the jitter value of the signal read out from the optical disc M, using the optical disc apparatus 1 equipped with the OPU 2 having the OBL 3b, and adjusting the defocus value used for moving the OBL 3b along the direction Df of the light axis of the OBL 3b when performing the focusing of the OBL 3b relative to the signal face Ms of the optical disc M, based on the detected jitter value.

Using the optical disc apparatus 1, by adding a focus bias or so-called defocus to the focus coil 3d, the jitter is measured. Firstly, with the defocus value of ±0, the jitter is measured. At this time, if the jitter value is below a prescribed value jitter (is) and the optical disc M is determined by the program in the CPU 10 to be the optical disc M of good jitter characteristics, then the defocus value is set to 0 and the defocus adjustment is finished.

With respect to the optical disc M not determined to have good jitter characteristics, the following measurement is made. Firstly, when the signal is read out form the optical disc M and the jitter value is detected, the defocus value is changed within the predetermined range. To be more specific, when the signal is read out from the optical disc M and the jitter value is detected, the defocus value is changed step by step within the predetermined range of numerical values, including the reference value 0 (FIGS. 3 and 4) of the defocus value and with the reference value 0 of the defocus value at the center thereof (FIG. 2: S1). Each time the defocus value is changed from one step to another, the jitter value is detected.

The operation of setting the defocus value is performed at the defocus value setting circuit 13 in the state of performing the operation of reproducing the signal recorded on the optical disc M (FIG. 1). The defocus value setting circuit 13 changes the defocus value to be set to the focus servo circuit 5 from −8% step by step with the increment of 2%, relative to the reference value 0 (FIGS. 3 and 4). In coordination with this, be detecting the jitter value of the reproduced signal corresponding to each defocus value at the jitter value detecting circuit 9, the defocus value is set.

To be more specific, in the state where the defocus value to the focus servo circuit 5 is set by the defocus value setting circuit 13 at the value about −8% lower then the reference value 0, the operation of reproducing the signal recorded on the optical disc M is performed and the jitter value included in the reproduced signal is detected by the jitter detecting circuit 9. Thus detected jitter value, together with the defocus value, is memorized in the memory circuit 12. The operation is repeated of changing the defocus value from −8% to +8% step by step with the increment of 2%, relative to the reference value 0, and detecting the jitter value corresponding to such defocus value and memorizing the jitter value together with the defocus value in the memory circuit 12.

When the operation of setting the defocus value starts in the optical disc apparatus 1, the operation of detecting the jitter value is performed each time the defocus value is changed within a predetermined range (FIG. 2: S1). The predetermined range indicates, when, for example, the defocus value 0 is determined as the reference value, the defocus values of −10% to +10%, relative to the reference value, set to the focus servo circuit 5 (FIGS. 3 and 4). The predetermined range of preferable defocus value is, when, for example, the defocus value 0 is determined as the reference value, the range from −8% to +8%, relative to the reference value, set to the focus servo circuit 5.

For example, when the defocus value is set to a value smaller then −10%, the focus servo function sometimes does not work properly. For example, when the defocus value is set to a value greater than +10%, the focus servo function sometimes does not work properly. From these facts, it is good that the defocus value in the range of −10% to ±10%, with the reference value 0 of the defocus value at the center thereof, is set to the focus servo circuit 5. Preferably, by setting the defocus value in the range of −8% to +8%, with the reference value 0 of the defocus value at the center thereof, to the focus servo circuit 5, the focus servo function works properly.

To the optical disc M (FIG. 1) whose jitter value is above the prescribed value and that has poor jitter characteristics, the following step is executed under the control of the program in the CPU 10. The following step is executed by the CPU 10 and the second memory circuit 12.

Firstly, the initial value is set by the program in the CPU 10, and i=−4 is set. For example, the value of "DEFOCUS=2%× i" is set to "FOCUS_BIAS". OPU 2 is caused to measure the jitter value and the result is stored in the second memory circuit 12 as "jitter (i)".

The "i" is incremented by the program in the CPU 10. The incrementing means increasing a numerical value by a fixed amount when a repetitive process, etc., are executed in programming. Again, "DEFOCUS=2%×i" is set to "FOCUS_ BISA".

If "i<5" applies, again OPU 2 is caused to measure the jitter value and the result is stored in the second memory circuit 12 as "jitter (i)". If "i>5" applies, then the minimum value is obtained out of "jitter (i)" and the "i" thereof is taken as "imin". If "i>5" applies, then the maximum value is obtained out of jitter (i)" and the "i" thereof is taken as "imax".

Next, based on the value of differences jitter (id) between the maximum jitter value jitter (imax) and the minimum jitter value jitter (imin) in the detected jitter values, optimum defocus value is set.

When, by changing the defocus value within the predetermined range, the operation of detecting the jitter is executed, the maximum jitter value jitter (imax) and the minimum jitter value jitter (imin) are selected out of the detected jitter values and a criterion value jitter (is) is set (FIG. 2: S2).

When the operation of selecting and setting of step S2 has been executed, judgment is made (S3) of whether [jitter (imax)−jitter (imin)>jitter (is)] applies (S3: Yes) or does not apply (S3: No). If it is determined that [jitter (imax)−jitter (imin)>jitter (is)] applies in step S3, then the defocus value corresponding to the jitter (imin) is set as the optimum defocus value (S4).

By executing the defocus value setting method of the optical disc apparatus 1 as described above, the optimum defocus value is set to the optical disc apparatus 1. Since the jitter value is detected each time the defocus value is changed step by step within the predetermined range of numerical values, including the reference value 0 of the defocus value and with the reference value 0 of the defocus value at the center thereof and the optimum defocus value is set based on the value of difference jitter (id) between the maximum jitter value jitter (imax) and the minimum jitter value jitter (imin) in the detected jitter values, the optimum defocus value is set to the optical disc apparatus 1. Since the optical defocus value is set to the optical disc apparatus 1, the OPU 2 performs a stabilized focus servo operation relative to the optical disc M and the operation of setting the defocus value in the optical disc apparatus 1 can be easily performed.

FIG. 3 is a characteristic diagram of relationship between the jitter value and the defocus value when it is determined in the CPU 10 (FIG. 1) that [jitter (imax)−jitter (imin)>jitter (is)] applies (FIG. 2, S3: Yes).

When the value of difference jitter (id) between the maximum jitter value jitter (imax) and the minimum jitter value jitter (imin) is greater than the predetermined value jitter (is), as shown in FIG. 3, the defocus value corresponding to the minimum jitter value jitter (imin) is set as the optimum defocus value.

The minimum jitter value jitter (imin) is smaller than the jitter value jitter (if) that is the value smaller than the maximum jitter value jitter (imax) by the criterion value jitter (is). In such a case, in the optical disc apparatus 1, the operation is performed of setting the defocus value corresponding to the minimum jitter value jitter (imin), namely, the defocus value +6% greater than the reference value 0, to the focus servo circuit 5 as the optimum defocus value.

In the program in the CPU 10 (FIG. 1), the following setting is made based on the value of "jitter (imax)−jitter (imin)". If the value of "jitter (imax)−jitter (imin)" is more than the constant value jitter (is), for example, "2%×imin" is set to "DEFOCUS". Thus the defocus adjustment is finished.

By executing the operation of setting the defocus value as above, the defocus value +6% greater than the reference defocus value 0 is set to the focus servo circuit 5 and the focus servo operation by the focus servo circuit 5 is performed with thus set defocus value at its center.

By executing the defocus value setting method of the optical disc apparatus 1 as above, the CPU 2 making up the optical disc apparatus 1 performs a stabilized focus servo operation relative to the optical disc M. The optical disc M with which the value of difference jitter (id) between the maximum jitter value jitter (imax) and the minimum jitter value jitter (imin) is greater than the predetermined value jitter (is) is considered to be the optical disc M of poor jitter characteristics. At the time of reading out the signal from the optical disc M of poor jitter characteristics, since the defocus value corresponding to the minimum jitter value jitter (imin) is set as the optimum defocus value, the stabilized focus servo operation is performed at the OPU 2.

At step S3 of FIG. 2, if it is determined that [(jitter (imax)− jitter (imin)>jitter (is)] does not apply (S3: No), then the reference defocus value 0 is set as the optimum defocus value (S5).

FIG. 4 is a characteristic diagram of the relationship between the jitter value and the defocus value when it is determined in the CPU 10 (FIG. 1) that [jitter (imax)−jitter (imin)>jitter (is)] does not apply (FIG. 2, S3: No).

When the value of difference jitter (id) between the maximum jitter value jitter (imax) and the minimum jitter value jitter (imin) is smaller than the predetermined value jitter (is), as shown in FIG. 4, the reference value 0 of the defocus value is set as the optimum defocus value. When the maximum value-minimum value (MAX-MIN) of the jitter value is smaller than the constant value, the defocus value is set at ±0.

The minimum jitter value jitter (imin) is greater than the jitter value jitter (if) that is then value smaller than the maximum jitter value jitter (imax) by the criterion value jitter (is). In such a case, since the change of the jitter value is small, the operation of setting the reference defocus value to the focus servo circuit 5 as the optimum defocus value is performed in the optical disc apparatus 1.

In the program in the CPU 10 (FIG. 1), the following setting is made based on the value of "jitter (imax)−jitter (imin)". If the value of "jitter (imax)−jitter (imin)" is smaller than the constant value jitter (is), 0 is set to "DEFOCUS". Thus the defocus adjustment is finished.

By executing the operation of setting the defocus value as above, the focus servo operation by the focus servo circuit 5 is performed with the reference defocus value 0 at the center thereof. Since the focus servo operation with the reference defocus value 0 at its center is performed, stabilized focus control can be performed in the OPU 2.

By executing the defocus value setting method of the optical disc apparatus 1 as above, the OPU 2 making up the optical disc apparatus 1 performs the stabilized focus servo operation relative to the optical disc M. The optical disc M with which the value of difference jitter (id) between the maximum jitter value jitter (imax) and the minimum jitter value jitter (imin) is smaller than the predetermined value jitter (is) is considered to be the optical disc M of good jitter characteristics. At the time of reading out the signal from the optical disc M of good jitter characteristics, since the reference value 0 of the defocus value is set as the optimum defocus value in the optical disc apparatus 1, no problem is caused to the focus servo operation of the OPU 2 and the stabilized focus servo operation is performed at the OPU 2. The operation of setting the defocus value in the optical disc apparatus 2 can be easily performed.

Before performing the operation of detecting the jitter value each time the defocus value is changed step by step within the predetermined range of numerical values, including the reference value 0 of the defocus value at the center thereof, the jitter value is detected based on the reference value 0 of the defocus value and, if the detected jitter value is smaller than the predetermined jitter value, then the reference value 0 of the defocus value is set as the optimum defocus value.

With the defocus value at ±0, if the jitter value is the predetermined jitter value jitter (if) or greater, then the defocus value is set at ±0 (FIG. 4). When the optical disc of good jitter characteristics is used, a priority is given to the stability of the focus servo.

As described above, the defocus value setting method of the optical disc apparatus 1 is a method of performing the operation of setting the optimum defocus value by detecting the jitter value each time the defocus value is changed by the predetermined % within the predetermined range with the reference value 0 of the defocus value at the center thereof. Before performing such operation, with the reference defocus value 0 being set as the defocus value, the operation of detecting the jitter value is performed. If the detected jitter value is smaller than the predetermined value, namely, if the optical disc M is judged to have good reproducing characteristics, then the operation of directly setting the reference defocus value 0 as the optimum defocus value is performed in the optical disc apparatus 1.

When the jitter value to be set for performing the operation of judging is set, for example, at the value smaller than the minimum jitter value jitter (imin), if the jitter value smaller than this set jitter value is detected, then the optical disc M can be determined to be a good disc and therefore, the reproducing operation can be performed with no problem without performing the operation of selecting the defocus value.

By executing the defocus value setting method of the optical disc apparatus 1 as above, when the optical disc M of good jitter characteristics is used, the setting of the defocus value can speedily be performed and the OPU 2 making up the optical disc apparatus 1 performs the stabilized focus servo operation relative to the optical disc M. The optical disc M with which the value of difference jitter (id) between the maximum jitter value jitter (imax) and the minimum jitter value jitter (imin) is smaller than the predetermined value jitter (is) is considered to be the optical disc M of good jitter characteristics. At the time of reading out the signal from the optical disc M of good jitter characteristics, since the reference value 0 of the defocus value is set as the optimum defocus value in the optical disc apparatus 1, no problem is caused to the focus servo operation of the OPU 2 and the stabilized focus servo operation is performed at the CPU 2.

Since the measurement at the defocus value ±0 and the setting of the defocus value ±0 are made at first, the measuring time for detecting the jitter value can be shortened. Only with respect to the optical disc M of a poor jitter value, the optical disc apparatus 1 equipped with the OPU 2 is caused to execute the defocus adjustment. Since the defocus adjustment is made with respect to the optical disc M of the poor jitter value, the initial measuring time of the optical disc M in the OPU 2 can be shortened. Since the defocus value is set at ±0 with respect to the optical disc M of a good jitter value, the stabilized focus servo can be executed with respect to the optical disc M of the good jitter value. Since the defocus value is set at ±0 with respect to the optical disc M having substantially no change of jitter value, a loss of focus or so-called F loss does not occur and the stabilized focus servo operation can be executed.

The optical disc apparatus 1 is capable of executing the defocus value setting method of the optical disc apparatus 1. Consequently, the optical disc apparatus 1 can be provided that is capable of setting the optimum defocus value. The F loss is prevented and the stabilized servo operation is performed in the optical disc apparatus 1 equipped with the OPU 2.

The optical disc apparatus 1 equipped with the OPU 2 can be used as a recording and reproducing device that records data and information of the optical disc or reproduces the data on the optical disc. The optical disc apparatus 1 equipped with the OPU 2 can also be used as a reproducing-only device that reproduces the data and information on the optical disc.

The OPU 2 is installed in the optical disc apparatus 1 to be assembled into, for example, a computer, audio/visual device, etc. The optical disc apparatus 1 equipped with the OPU 2 can be installed in, for example, computers such as notebook personal computers, lap-top personal computers, and desk-top personal computers, audio/visual devices accommodating such discs as CDs and DVDs, etc. (none shown).

While description has been made of the embodiment of the present invention, the above embodiment is intended for easy understanding of the present invention and is not to be interpreted to limit the present invention. Changes and improvements can be made to the present invention without departing from the intent thereof and the present invention includes equivalents thereof.

What is claimed is:
1. An optical disc apparatus comprising:
an optical pickup unit including an objective lens;
a jitter value detecting circuit that detects a jitter value based on a signal read out from an optical disc, and that detects the jitter value each time a defocus value is changed step by step within a predetermined range of numerical value including a reference value of the defocus value; and
a defocus value setting circuit that adjusts the defocus value used for moving the objective lens along the direction of a light axis when focusing of the objective lens to the optical disc is performed, based on the jitter value and adjusting of a focus of the objective lens to the optical disc, and that sets an optimum defocus value based on a value of difference between a maximum jitter value and a minimum jitter value out of the detected jitter values.

2. A defocus value setting method of an optical disc apparatus, comprising:

detecting of a jitter value of a signal read out from an optical disc, using the optical disc apparatus comprising an optical pickup unit having an objective lens;

adjusting of a defocus value used for moving the objective lens along the direction of a light axis when focusing of the objective lens to the optical disc is performed, based on the jitter value and adjusting of a focus of the objective lens to the optical disc;

detecting of the jitter value each time the defocus value is changed step by step within a predetermined range of numerical value including a reference value of the defocus value; and setting of an optimum defocus value based on a value of difference between a maximum jitter value and a minimum jitter value out of the detected jitter values.

3. A defocus value setting method of an optical disc apparatus, comprising:

detecting of a jitter value each time a defocus value is changed step by step within a predetermined range of numerical value including a reference value of the defocus value; and setting of an optimum defocus value based on a value of difference between a maximum jitter value and a minimum jitter value out of the detected jitter values, when a focus adjustment of an objective lens to an optical disc apparatus including:

a focus servo circuit to which a focus error signal is input that is generated based on the signal detected by a photodetector installed in an optical pickup unit and which generates a control signal to displace the objective lens installed in the optical pickup unit substantially along the direction of a light axis that is the direction orthogonal to a face of the optical disc;

a jitter value detecting circuit that detects the jitter value based on the signal detected by the photodetector; and a defocus value setting circuit that adjusts that defocus value used for moving the objective lens along the direction of the light axis when focusing of the objective lens to the optical disc is performed, based on the signal that has gone through the jitter value detecting circuit, and causes the focus servo circuit to make a defocus adjustment based on the defocus value.

4. The defocus value setting method of an optical disc apparatus of claim 2, further comprising:

setting of the defocus value corresponding to the minimum jitter value as the optimum defocus value when the value of difference between the maximum jitter value and the minimum jitter value is greater than a predetermined value.

5. The defocus value setting method of an optical disc apparatus of claim 3, further comprising:

setting of the defocus value corresponding to the minimum jitter value as the optimum defocus value when the value of difference between the maximum jitter value and the minimum value is greater than a predetermined value.

6. The defocus value setting method of an optical disc apparatus of claim 2, further comprising:

setting of the reference value of the defocus value as the optimum defocus value when the value of difference between the maximum jitter value and the minimum jitter value is smaller than a predetermined value.

7. The defocus value setting method of an optical disc apparatus of claim 3, further comprising:

setting of the reference value of the defocus value as the optimum defocus value when the value of difference between the maximum jitter value and the minimum jitter value is smaller than a predetermined value.

8. The defocus value setting method of an optical disc apparatus of claim 2, further comprising:

detecting of the jitter value based on the reference as the optimum defocus value when the detected jitter value is smaller than a predetermined jitter value, before performing an operation of detecting the jitter value each time the defocus value is changed step by step within the predetermined range of numerical value, including the reference value of the defocus value.

9. The defocus value setting method of an optical disc apparatus of claim 3, further comprising:

detecting of the jitter value based on the reference value of the defocus value; and setting of the reference value of the defocus value as the optimum defocus value when the detected jitter value is smaller than a predetermined jitter value, before performing an operation of detecting the jitter value each time the defocus value is changed step by step within the predetermined range of numerical value, including the reference value of the defocus value.

10. An optical disc apparatus comprising:

an optical pickup unit including a photodetector and an objective lens;

a focus servo circuit to which a focus error signal is input that is generated based on a signal detected by the photodetector and which generates a control signal to displace the objective lens substantially along a direction of a light axis that is a direction orthogonal to a face of the optical disc;

a jitter value detecting circuit that detects, based on the signal detected by the photodetector, a jitter value each time a defocus value is changed step by step within a predetermined range of numerical value including a reference value of the defocus value; and a defocus value setting circuit that adjusts that defocus value used for moving the objective lens along the direction of the light axis when focusing of the objective lens to the optical disc is performed, based on the signal that has gone through the jitter value detecting circuit, and causes the focus servo circuit to make a defocus adjustment based on the defocus value and that sets an optimum defocus value based on a value of difference between a maximum jitter value and a minimum jitter value out of the detected jitter values.

* * * * *

UNITED STATES PATENT AND TRADEMARK OFFICE
CERTIFICATE OF CORRECTION

PATENT NO. : 7,663,988 B2
APPLICATION NO. : 11/560248
DATED : February 16, 2010
INVENTOR(S) : Muraoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO.         : 7,663,988 B2                                           Page 1 of 1
APPLICATION NO.    : 11/560248
DATED              : February 16, 2010
INVENTOR(S)        : Yasuhiro Muraoka

It is certified that error appears in the above-identified patent and that said Letters Patent is hereby corrected as shown below:

Column 15, line 30 (Claim 3), after "disc" insert -- is made and the jitter value is detected by reading out a signal from the optical disc, using the optical disc --.

Column 16, line 2 (Claim 5), after "minimum" insert -- jitter --.

Column 16, line 17 (Claim 8), after "reference" insert -- value of the defocus value; and setting of the reference value of the defocus value --.

Signed and Sealed this
Third Day of April, 2012

David J. Kappos
*Director of the United States Patent and Trademark Office*